(12) United States Patent
Cobler

(10) Patent No.: US 10,293,980 B2
(45) Date of Patent: *May 21, 2019

(54) POLYMERIC FILMS AND BAGS

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

(*) Notice: Subject to any disclaimer, the term of this patent is extended or adjusted under 35 U.S.C. 154(b) by 260 days.

This patent is subject to a terminal disclaimer.

(21) Appl. No.: 15/397,863

(22) Filed: Jan. 4, 2017

(65) Prior Publication Data
US 2017/0113839 A1   Apr. 27, 2017

Related U.S. Application Data

(62) Division of application No. 14/645,533, filed on Mar. 12, 2015, now Pat. No. 9,573,729.

(51) Int. Cl.
| | |
|---|---|
| B65D 30/08 | (2006.01) |
| B65D 30/10 | (2006.01) |
| B31D 1/00 | (2017.01) |
| B65D 33/02 | (2006.01) |
| B65D 33/28 | (2006.01) |
| B65F 1/00 | (2006.01) |
| B31B 70/81 | (2017.01) |
| B31B 160/10 | (2017.01) |
| B31B 155/00 | (2017.01) |
| B31B 70/00 | (2017.01) |

(52) U.S. Cl.
CPC ............ B65D 31/02 (2013.01); B31B 70/81 (2017.08); B31D 1/00 (2013.01); B65D 31/16 (2013.01); B65D 33/02 (2013.01); B65D 33/28 (2013.01); B65F 1/00 (2013.01); B65F 1/002 (2013.01); B31B 70/008 (2017.08); B31B 70/8134 (2017.08); B31B 2155/00 (2017.08); B31B 2160/10 (2017.08); B65F 2250/1143 (2013.01)

(58) Field of Classification Search
None
See application file for complete search history.

(56) References Cited

U.S. PATENT DOCUMENTS 10,138,054 B2 * 11/2018 Cobler et al. ......... B65F 1/0006

* cited by examiner

*Primary Examiner* — Monica A Huson
(74) *Attorney, Agent, or Firm* — Daniel J. Layden; Brandon J. Lee

(57) ABSTRACT

The present invention is directed to a method of incrementally stretching polymeric film formed from a blown film extrusion process. The present invention is further directed to a polymeric bag formed from an incrementally stretched polymeric film. The incremental stretching is performed on a collapsed polymeric bubble via a pair of intermeshing rollers. The incrementally stretched polymeric film may be stretched only along a portion of its width. The polymeric bag may be a drawstring trash bag with an extended hem where only the extended hem of the bag or the body of the bag comprises incrementally stretched polymeric film.

20 Claims, 15 Drawing Sheets

POLYMERIC FILMS AND BAGS

CROSS-REFERENCE TO RELATED APPLICATIONS

This application is a divisional of application Ser. No. 14/645,533, filed on Mar. 12, 2015, and is hereby incorporated by reference into this disclosure.

BACKGROUND OF THE INVENTION

1. Field of the Invention

The present invention relates to improvements in the construction and manufacture of polymeric film and bags. In particular, the present invention relates to improvements in varying the thickness of film formed from a blown film extrusion process and constructing polymeric bags from the resultant film.

2. Description of the Related Art

Polymeric bags are ubiquitous in modern society and are available in countless combinations of varying capacities, thicknesses, dimensions, and colors. The bags are available for numerous applications including typical consumer applications such as long-term storage, food storage, and trash collection. Like many other consumer products, increased demand and new technology have driven innovations in polymeric bags improving the utility and performance of such bags. The present invention is an innovation of particular relevance to polymeric bags used for trash collection.

Polymeric bags are manufactured from polymeric film produced using one of several manufacturing techniques well-known in the art. The two most common methods for manufacture of polymeric films are blown-film extrusion and cast-film extrusion. In blown-film extrusion, the resulting film is tubular while cast-film extrusion produces a generally planar film. The present invention is generally applicable to drawstring trash bags manufactured from a blown-film extrusion process resulting in tubular film stock. Manufacturing methods for the production of drawstring bags from a web of material are shown in numerous prior art references including, but not limited to, U.S. Pat. Nos. 3,196,757 and 4,624,654, which are hereby incorporated by reference.

In blown film extrusion, polymeric resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a polymeric film tube emerges from the outlet of the extrusion die.

The polymeric film tube is blown or expanded to a larger diameter by providing a volume of air within the interior of the polymeric film tube. The combination of the volume of air and the polymeric film tube is commonly referred to as a bubble between the extrusion die and a set of nip rollers. As the polymeric film tube cools travelling upward toward the nip rollers, the polymeric film tube solidifies from a molten state to a solid state after it expands to its final diameter and thickness. Once the polymeric film tube is completely solidified, it passes through the set of nip rollers and is collapsed into a collapsed polymeric tube, also referred to as a collapsed bubble.

One common household item formed from the polymeric film produced by a blown film extrusion process are drawstring trash bags. Frequently, drawstring trash bags are used to line a rigid container, such as a trash can, for the disposal of household trash. When used with a rigid container, it is common to fold the upper opening of a drawstring trash bag over the upper rim of the container to keep the upper opening of the bag accessible. Some rigid containers provide retaining devices to hold the upper opening of a drawstring bag in place while, in other instances, the drawstring bag may provide certain features or properties that facilitate keeping the bag in place on the container. The use of these rigid containers is particularly common in connection with 13-gallon drawstring bags. Rigid containers may also be used with larger bags, such as those commonly used for the collection of outdoor or yard waste. When drawstring bags are used with supporting rigid containers, the drawstring trash bag is often filled with trash and other debris until the capacity of the container or trash bag is reached.

After filling the drawstring bag with trash or debris, the bag and its contents are generally pulled out of the rigid container in one of several ways. Some consumers may prefer to pull the drawstrings taut, using the drawstrings to pull the bag and its contents out of the container. However, in many cases, consumers pull the bag out of the rigid container before pulling the drawstrings taut. In such cases, a consumer will typically grab the upper opening of the bag hem or, more commonly, the area immediately below the hem. As the consumer grabs the bag and pulls it out of the container, significant force can result in the area immediately below the hem. This force on the hem is due to the weight of the bag contents and the pulling action by the consumer, which can cause the polymeric film to puncture or fail in this region of the bag—especially when the contents of the bag are particularly heavy. Thus, there is a need to improve the strength and puncture resistance of the hem and the area immediately below the hem.

Another aspect of prior art drawstring bags that may be subject to improvement is the tendency for the hems of drawstring bags to detach if there are even minor manufacturing defects. In particular, if the pressure or heat used to create the hem seal across the width of the drawstring trash bag is too great, the integrity of the drawstring trash bag may be endangered due to crystallization of the polymeric film along the hem seal. In these cases, when the drawstring trash bag is filled with trash or debris, the hem seal may fail causing the entire length of the hem, and the drawstring contained within the hem, to "zipper" or detach from the rest of the bag. Thus, there is a need to improve the robustness of the hem seal to ensure that the drawstring is retained about the opening of the trash bag.

Another further improvement of prior art drawstring trash bags may be to reduce the cost of producing the trash bags. A substantial cost of manufacturing trash bags can be related to the cost of polymeric resin used to produce a bag. One way to decrease the cost of producing bags is to decrease the thickness of film used in their manufacture, which reduces the amount of polymeric resin required to make a bag. However, reducing the thickness of film used to produce a bag can lead to a reduction in the strength of the bag. Thus, a need exists to decrease the use of resin to produce drawstring trash bags while maintaining enough strength so that the bags do not fail when used.

One method of thinning out the material of a bag is by incrementally stretching the film. Stretching the film incrementally allows stretching the film in only selected areas of the film. Incrementally stretching also provides for a ribbed pattern to be placed on the bag that may serve to differentiate the appearance of the bag. The incremental stretching can maintain the thickness of the bag in segments that are not stretched that can be referred to as thick ribs. These thick ribs may be perceived by an end user of the bag such that the bag is perceived to be as thick as the previously un-stretched film.

In the prior art, U.S. Pat. No. 4,116,892 to Schwarz discloses using a pair of grooved intermeshing rollers to incrementally stretch an orientable polymeric material in a direction transverse to the machine direction. In a related field, U.S. Pat. No. 5,041,255 to Zafiroglu discloses the use of a pair of intermeshing circumferentially ribbed rollers for stretching portions of a fibrous web.

In a much later publication, US Pat. Appl. Pub. 2012/0088645A1 discloses use of intermeshing rollers, each roller having a plurality of circular ridges protruding outwards, to stretch a portion of a polymeric web in a direction transverse to the machine direction. The application further discloses that the use of the aforementioned intermeshing rollers can be used on the film so that the panels of the trash bag are imparted with a ribbed pattern running in a lengthwise direction, parallel to the direction that the film is extruded.

In light of the foregoing, it would be desirable to provide a means for reinforcing the drawstring trash bag in the area immediately adjacent/below the hem area of the trash bag while also controlling the thickness of the reinforced areas. It would also be desirable to provide additional improvements to the manufacture of drawstrings bags by thinning out the bags in desirable locations to provide targeted strengthening and light weighting of the bag. The present invention represents a novel solution to address this needs.

SUMMARY OF THE INVENTION

In at least one embodiment of the invention, a master roll of polymeric film for forming trash bags may be formed. To form the master roll, a polymeric film tube may be formed by a blown film extrusion process. Once the polymeric film tube is formed, it may be collapsed by a pair of nip rollers to form a collapsed bubble. A pre-selected partial width of the collapsed bubble may be ring-rolled to form an incrementally stretched collapsed bubble. The incrementally stretched collapsed bubble may be slit lengthwise. The slitting of the collapsed bubble may be proximate to a centerline of the collapsed bubble. The slit collapsed bubble may be separated into a first half-bubble and a second half-bubble. The pre-selected partial width that is incrementally stretched may be centered approximately along the centerline of the collapsed bubble. Each of the half-bubbles may include a fraction of the pre-selected partial width. Each fraction of the pre-selected partial width may extend from an edge of each collapsed half-bubble towards the centerline of each collapsed bubble. Each fraction of the pre-selected partial width may be less than one-half of the width of each half-bubble. Once stretched, each of the half-bubbles may be rolled onto a separate master roll. Once the master roll is formed, it may be placed at the head end of a bag converting line to form drawstring trash bags.

In an alternative embodiment, two separate pre-selected widths of the above-discussed collapsed bubble may be ring-rolled rather than a single pre-selected width. Each of the two separate pre-selected widths may be offset from the centerline of the collapsed bubble and offset from each edge of the collapsed bubble.

The ring rolling of the incrementally stretched film may include the collapsed bubble entering a pair of intermeshing rollers. Each of the intermeshing rollers may include a plurality of grooves perpendicular to the axis of the rollers. The plurality of grooves on a first roller of the pair of intermeshing rollers may intermesh with the plurality of grooves on a second roller of the pair of intermeshing rollers. An axis of the first roller may be parallel to an axis of the second roller and the axis of each roller may be perpendicular to the machine direction of the collapsed bubble. The pair of intermeshing rollers may incrementally stretch only a section or partial width of the collapsed bubble. The collapsed bubble may increase in overall width after passing through the pair of intermeshing rollers. Each intermeshing roller may rotate in a direction that the collapsed bubble is moving so that the collapsed bubble is drawn through the pair of intermeshing rollers. The ring rolling may also include a pair of spreading rollers downstream from the pair of intermeshing rollers. The axis of the spreading rollers may be parallel to each other and perpendicular to the machine direction of the collapsed bubble. The pair of spreading rollers may maintain tension in the collapsed bubble and spread out the overall width of the collapsed bubble after being stretched by the pair of intermeshing rollers.

In another embodiment of the present invention, bags may be formed from a polymeric film by a blown film extrusion process. The blown film extrusion process may form a polymeric film tube. The polymeric film tube may be collapsed to form a collapsed bubble and the collapsed bubble may have a collapsed bubble width extending from a first edge to a second edge of the collapsed bubble. The collapsed bubble may be separated into a first half-bubble and a second half-bubble by a slitting operation. The first half-bubble may be rolled onto a first master roll and the second half-bubble may be rolled onto a second master roll. The first master roll may be fed into the front or head end of a bag converting line. Prior to converting the first master roll into bags, a portion of the collapsed bubble may be ring rolled. The ring rolling may be centered along a centerline of the first half-bubble. The ring rolled portion may comprise a partial width of the first half-bubble and extend from a first edge of the first half-bubble toward and opposite second edge of the first half-bubble. The partial width of the first half-bubble may have a length that is less than half of a width of the first half-bubble.

In a further embodiment of the invention, polymeric bags may be formed by a blown film extrusion process. The blown film extrusion process may form a polymeric film tube. Once the polymeric film tube is formed, it may be collapsed by a pair of nip rollers to form a collapsed bubble. The collapsed bubble may have a first edge and a second edge, both extending along a length of the collapsed bubble, a distance between the first and the second edge defining a width of the collapsed bubble. The collapsed bubble may be slit along the first edge. A portion of a width of the collapsed bubble may be ring-rolled to form an incrementally stretched portion. The incrementally stretched portion may form an incrementally stretched partial width that may be centered along a centerline of the collapsed bubble. The incrementally stretched partial width, in the alternative, may extend adjacent from the first side edge of the collapsed bubble towards the second side edge of the collapsed bubble. The incrementally stretched partial width may have a width less than half the width of the collapsed bubble. Once the collapsed bubble is incrementally stretched, it may feed into a bag converting operation and formed into bags. The ring rolling may be performed synchronously with the forming of the polymeric film tube and the forming of the bags.

In an additional embodiment of the invention, a bag may be formed from polymeric film from a collapsed polymeric bubble formed from a blown film extrusion process. The bag may include a front panel and a back panel. The front panel and back panel may be generally joined along a first side edge, a second side edge, and a bottom edge of the respective front panel and back panel. The front panel may have a distal edge opposite the bottom edge. The distal edge of the front panel may result from the folded over portion of the front panel. The distal edge of the front panel may provide a first hem and a first overlap area immediately below the first hem. A drawstring may be encapsulated within the first hem. The top of the hem may define an upper opening of the polymeric bag. The first overlap area may comprise at least two layers of polymeric film below the first hem. The at least two layers of polymeric film of the first overlap area may be sealed together by a lower seal. The first overlap area may fail to include a drawstring. The first hem and the first overlap area may comprise an incrementally stretched partial width of the collapsed bubble. The incrementally stretched partial width of the collapsed bubble may be incrementally stretched synchronously with the blown film extrusion process that forms the collapsed bubble. The at least two layers of polymeric film of the first overlap area immediately adjacent or proximate to the first lower seal may comprise un-stretched polymeric film.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 1 provides a side view of a first embodiment of the present invention.

FIG. 2 provides a partial perspective view of the first embodiment shown in FIG. 1.

FIG. 3 provides a perspective view of a pair of intermeshing rollers utilized in the first embodiment.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Figure 1:
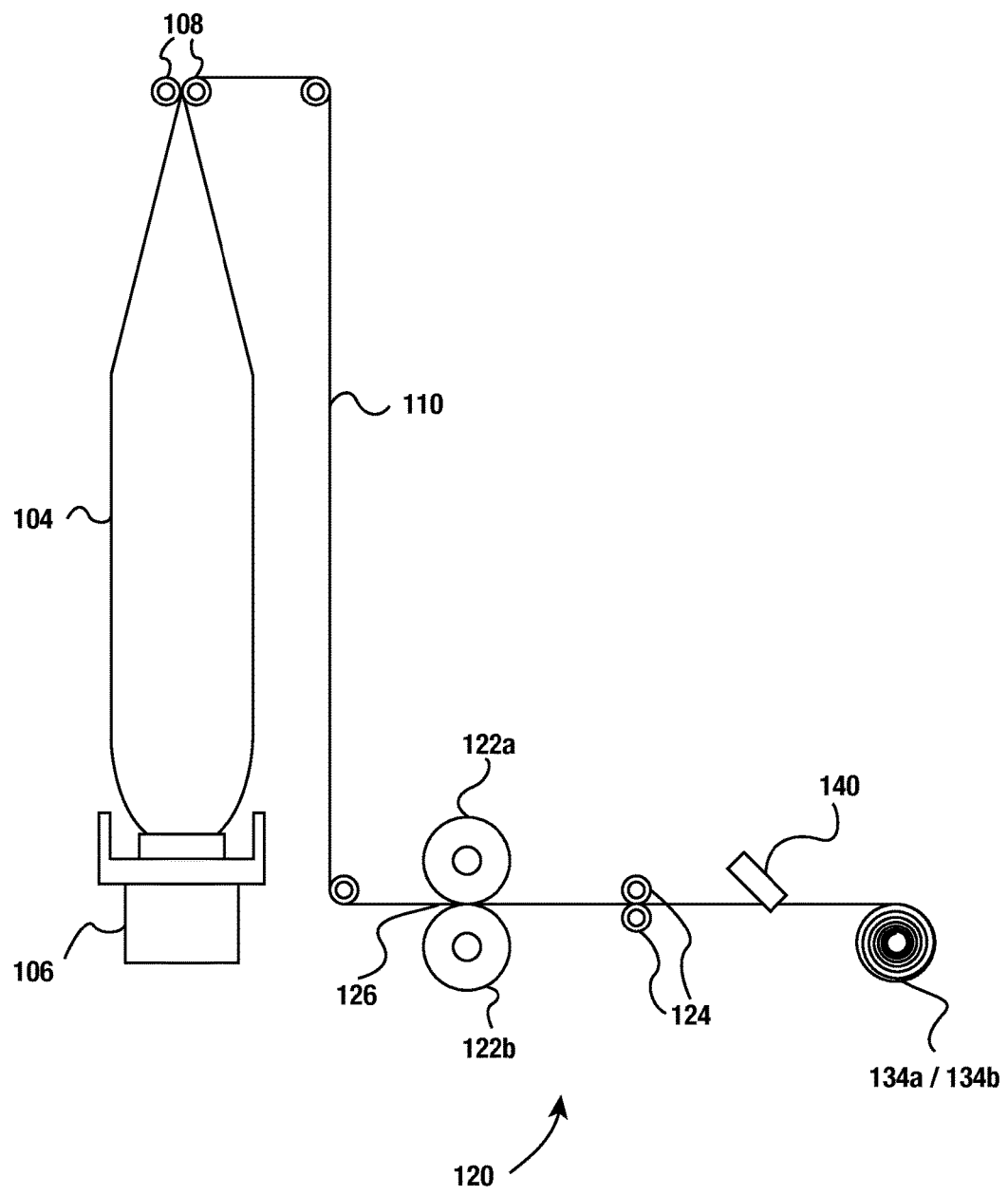
Figure 2:
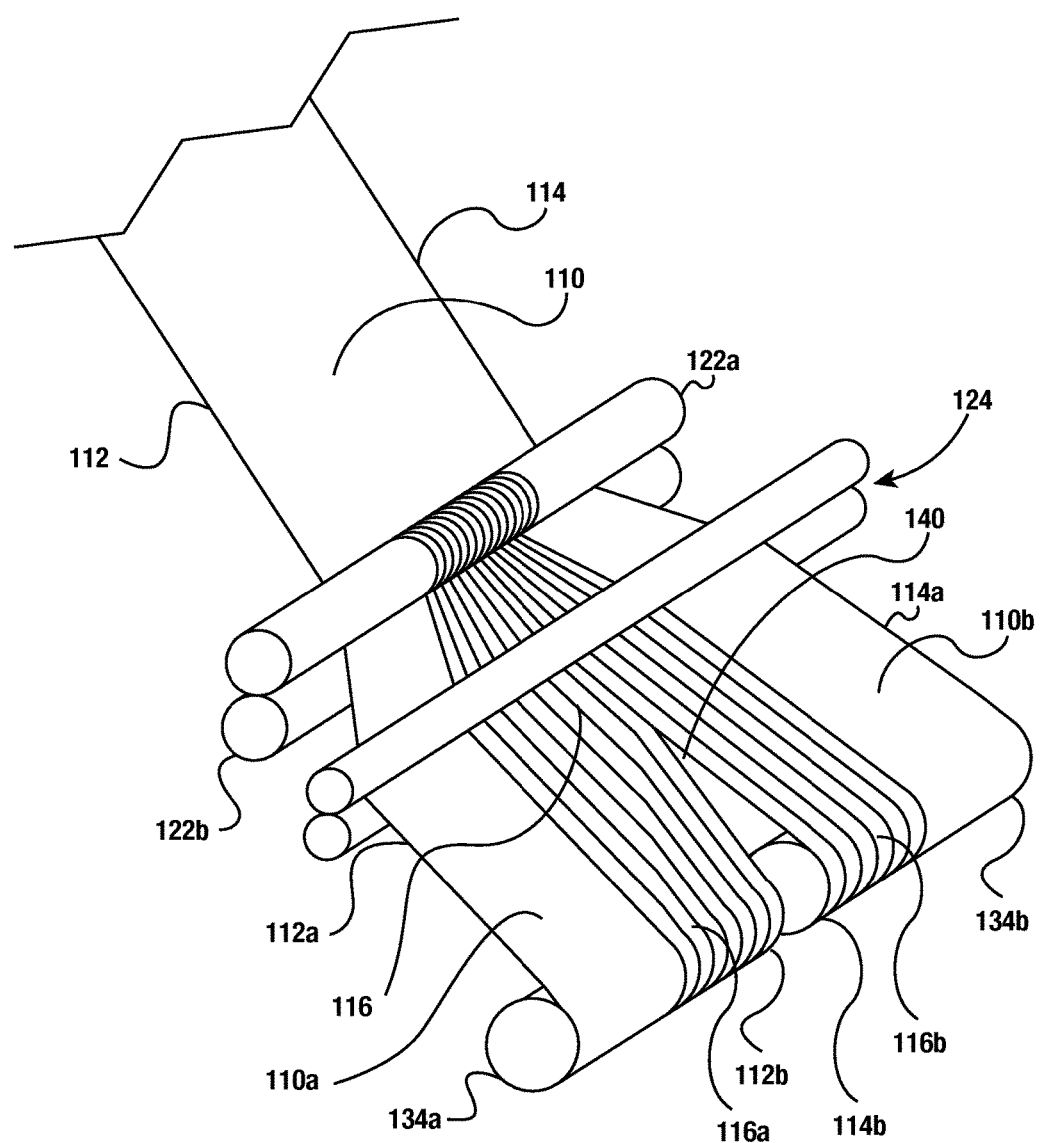

FIG. 1 provides a side view of a first embodiment of the present invention while FIG. 2 provides a perspective partial view of the same embodiment. The first embodiment is a process for forming two sections of an incrementally stretched split polymeric film tube. The polymeric tube is divided lengthwise into two sections and rolled onto two master rolls. The polymeric film tube, which may also be referred to as a bubble, is formed by a blown film extrusion process.

The blown film extrusion process begins by molten polymeric resin being extruded through an annular die to form a bubble or tube of molten polymeric film 104. The direction that the film is extruded out of the die is commonly referred to as the machine direction. The direction of extrusion may also be referred to as the lengthwise direction of the bubble or polymeric film tube 104. Hence, the length of the polymeric tube 104 extends parallel with the machine direction. The direction transverse to the machine direction is commonly referred to as the cross direction. The blown film extrusion process is well known in the art and is further explained in U.S. Pat. No. 7,753,666, which is hereby incorporated by reference in its entirety.

The polymeric resin used in the blown film extrusion process may vary. However, for forming polymeric bags, a polyethylene resin is commonly used. In the current state of the art for polymeric bags, a blend of various polyethylene polymers may be used. A polymer blend can have linear low-density polyethylene (LLDPE) as the primary component, but other polymers may be utilized including, but not limited to, other polyethylene resins such as high-density polyethylene (HDPE) or low-density polyethylene (LDPE). Typically, the primary component of the polymer blend, such as linear low-density polyethylene (LLDPE), will comprise at least 75% of the polymer blend. The remaining portion of the polymer blend may include additives including, but not limited to, coloring additives, anti-blocking agents, and/or odor control additives.

As shown in FIG. 1, once the bubble 104, or polymeric tube, of molten film solidifies, the bubble 104 is collapsed by a pair of nip rollers 108, which results in a collapsed bubble 110. The collapsed bubble 110 includes two opposing interconnected surfaces of film extending continuously in a lengthwise direction. As shown in FIG. 2, once collapsed, the collapsed bubble 110 has a first edge 112 and second edge 114 defined in the opposing edges of the collapsed bubble 110 extending the length of the collapsed bubble 110. The distance from the first edge 112 to the second edge 114 of the collapsed bubble 110 can define a width of the collapsed bubble. The nip rollers 108 are commonly elevated above the extruder 106 a considerable distance, since the molten bubble 104 is air-cooled and requires a relatively large vertical distance to cool and solidify before the bubble 104 is collapsed. Once the collapsed bubble 110 returns from the cooling tower (not shown), the collapsed bubble 110 can feed directly into a ring-rolling operation 120. As shown in FIG. 1 and more clearly in FIG. 2, the ring rolling operation 120 can be configured to stretch only a portion of the width of the collapsed bubble 110. The ring rolling operation can include a pair of intermeshing rollers 122a, 122b and a pair of spreading rollers 124a, 124b.

Figure 3:
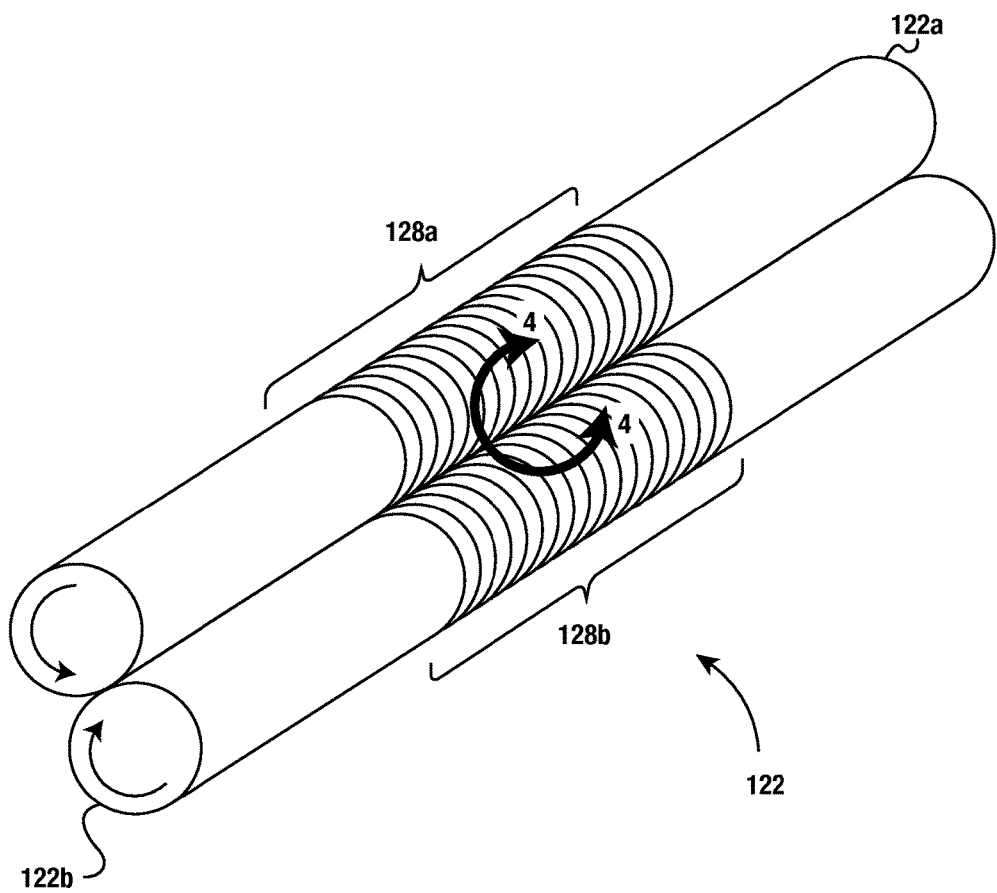
Figure 4:
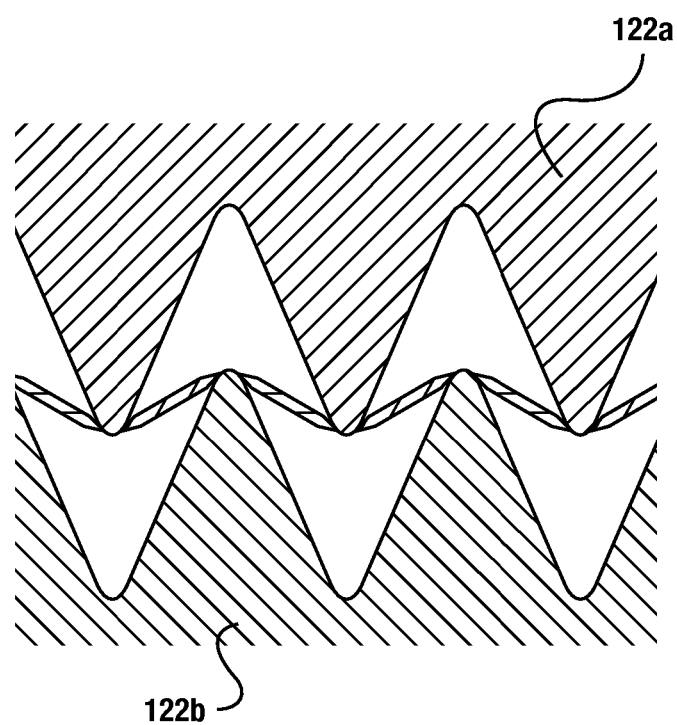
FIG. 4 is a cross-sectional view of the intermeshing rollers taken along circle 4-4 of FIG. 3.

As shown in FIGS. 3 and 4, the pair of intermeshing rollers 122a, 122b has a plurality of grooves 128a, 128b and corresponding concentric rings formed perpendicular in relation to the axis of the intermeshing rollers 122a, 122b. The pair of intermeshing rollers 122a, 122b can be arranged with the axis of each roller parallel to each other and perpendicular to the machine direction of the collapsed bubble 110. The pair of intermeshing rollers 122a, 122b rotates in opposite directions from each other, as shown in FIG. 3, so that the collapsed bubble 110 is drawn through the pair of intermeshing rollers 122a, 122b. The tension in the collapsed bubble 110 is maintained after passing through the intermeshing rollers 122a, 122b by a pair of spreading rollers 124 as shown in FIGS. 1 and 2. The spreading rollers 124 ensure that the collapsed bubble 110 spreads evenly over its width and maintains the appropriate amount of tension in the collapsed bubble 110. The spreading rollers 124 are typically arranged with each axis parallel to each other and perpendicular to the machine direction of the collapsed bubble 110.

As shown in FIGS. 1 and 2, once the collapsed bubble 110 passes into the nip 126 of the pair of intermeshing rollers 122a, 122b, the collapsed bubble 110 is deformed by the plurality of grooves 128a, 128b and is stretched by a factor of a draw ratio. The draw ratio is a ratio between the path-length that the plurality of grooves 128a, 128b causes the film to take versus the original length of the film width passed through the plurality of grooves 128a, 128b, as illustrated in FIG. 4. Since the collapsed bubble 110 enters the intermeshing rollers 122a, 122b travelling in the machine direction, the intermeshing rollers 122a, 122b incrementally stretch the collapsed bubble 110 in the cross direction—transverse to the machine direction.

As shown in FIG. 4, the film of the collapsed bubble 110 is stretched in between each groove of the plurality of grooves 128a, 128b, which results in a pattern of stretched and un-stretched lengths extending along the length of the collapsed bubble 110. Examined closely, this pattern of stretched and un-stretched lengths results in a pattern of parallel thick ribs (un-stretched lengths) and thin ribs (stretched lengths) extending in the machine direction of the collapsed bubble 110. In one particular embodiment, the spacing of the grooves can be 20 grooves per inch, with each groove leading to a matching thin rib/thick rib extending along the length of the collapsed bubble 110. The spacing of the ribs in the film after stretching is greater than the groove spacing of the intermeshing rollers 122a, 122b, since the stretching causes each rib to spread away from each other. The pattern of thick and thin ribs is represented by a pattern of parallel and adjacent lines in the figures. The spacing between ribs is exaggerated for ease of illustration.

Once the collapsed bubble 110 has been incrementally stretched in the cross direction, the collapsed bubble 110 can be slit to form two separate partial collapsed bubbles 110a and 110b. As shown in FIGS. 1 and 2, the slitting operation 140 of the collapsed bubble 110 can occur approximately at a location between the first edge 112 and second edge 114 of the collapsed bubble 110. A centerline can be defined to extend parallel to the length of the collapsed bubble and at the center of the collapsed bubble 110, relative to the first edge 112 and second edge 114. The centerline of the collapsed bubble 110 is also parallel to the first edge 112 and second edge 114. The slitting operation 140 can be located approximately at the centerline of the collapsed bubble 110. Once the collapsed bubble 110 is slit at the centerline, it can be separated into two half-bubbles 110a, 110b and each half-bubble can be rolled onto separate master rolls 134a, 134b. The first half-bubble 110a can have a first edge 112a and a second edge 112b, the second edge 112b formed from the splitting operation 140. The second half-bubble 110b can have a first edge 114a and a second edge 114b, the second edge 114b formed from the splitting operation 140.

As shown in FIGS. 2 and 3, the plurality of grooves 128a, 128b, can be centered along the centerline of the collapsed bubble 110. Hence, the ring rolling operation 120 results in a first incrementally stretched partial width 116 centered about the width of the collapsed bubble 110. After the collapsed bubble 110 is split into a first and second half bubbles 110a, 110b, the first incrementally stretched partial width 116 of the collapsed bubble 110 results in a second incrementally stretched partial width 116a of the first half-bubble 110a and a third incrementally stretched partial width 116b of the second half-bubble 110b. The second and third incrementally stretched partial widths 116a, 116b extend from one of the second edges 112b, 114b of each half-bubble 110a, 110b, towards one of the first edges 112a, 114a of each half-bubble 110a, 110b. In at least one embodiment, the second and third incrementally stretched partial widths 116a, 116b, can have a width that is less than half the width of each half-bubble 110a, 110b.

In one particular example, the collapsed bubble 110 may have a width prior to stretching of 60 inches. The plurality of grooves 128a, 128b of the intermeshing rollers 122a, 122b may have a width of approximately 16 inches and a depth of engagement so that the 16 inches of the collapsed bubble 110 that is engaged by the intermeshing rollers 122a, 122b is stretched to approximately 20 inches. Thus, once stretched, the width of the collapsed bubble 110 is approximately 64 inches. Once the collapsed bubble 110 is separated into a first half-bubble 110a and a second half-bubble 110b, each half bubble 110a, 110b has an overall width of approximately 32 inches with an incrementally stretched partial width 116a, 116b of approximately 10 inches.

As shown in FIGS. 1 and 2, each operation, including the blown film extrusion and incremental stretching of the collapsed bubble 110 can be performed synchronously. For example, at the same time a portion of the bubble 104 is being formed by the extruder 106, the same bubble 104, in the form of a collapsed bubble 110, can be incrementally stretched by the intermeshing rollers 122a, 122b.

Once each incrementally stretched collapsed half-bubble 110a, 110b has been rolled onto a master roll, each master roll 134a, 134b can then be used to manufacture polymeric bags, including drawstring trash bags. One particular type of drawstring trash bag that the present invention is particularly well suited for use is an extended hem drawstring trash bag, which is explained in greater detail below.

Figure 5:
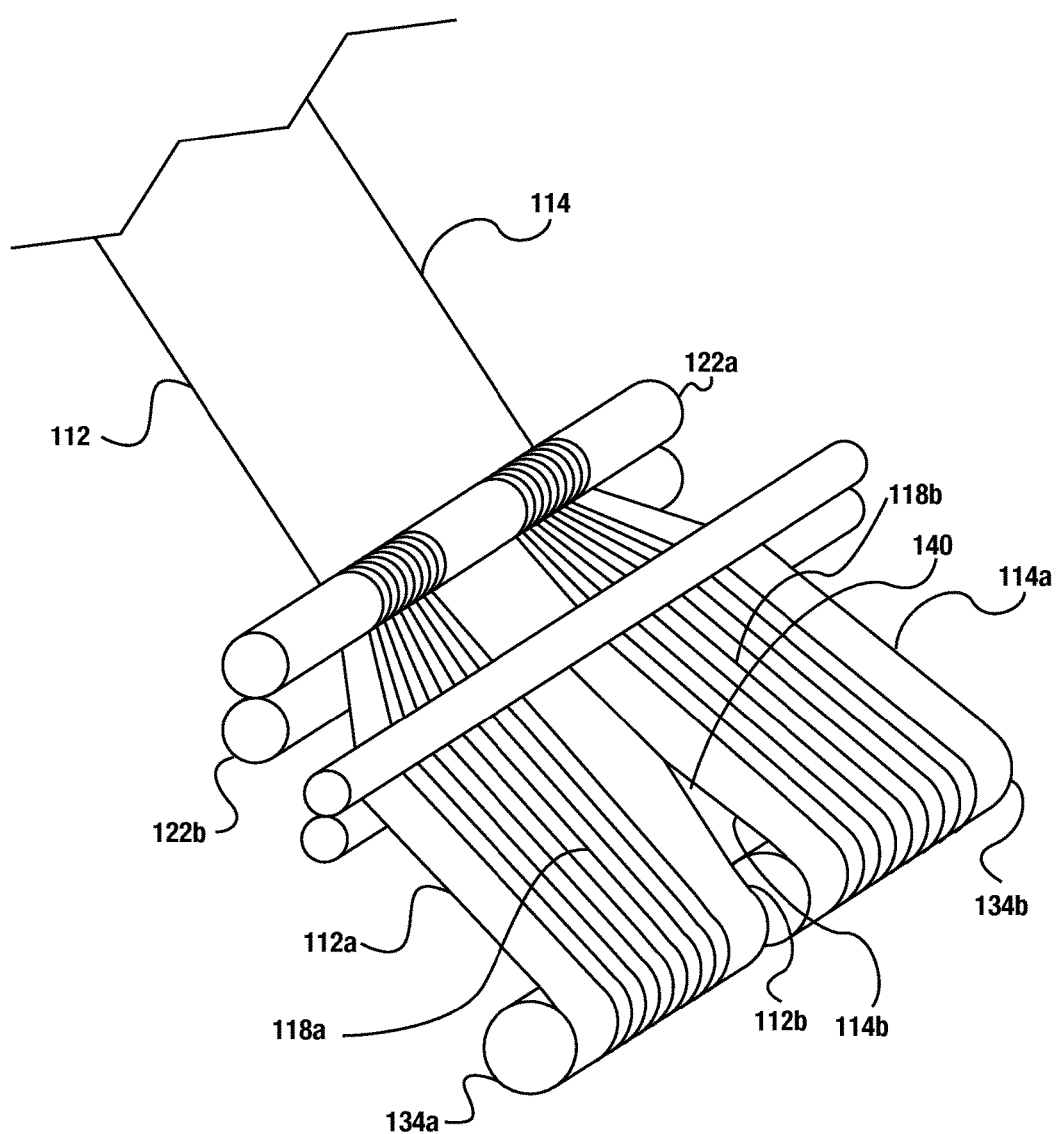
FIG. 5 is a partial perspective view of a second embodiment of the present invention.

The collapsed bubble 110 can be stretched in other locations other than about the centerline of the collapsed bubble 110 as shown in FIG. 2. FIG. 5 shows use of incremental stretching to form two discrete widths, a first incrementally stretched partial width 118a, and a second incrementally stretched partial width 118b of the collapsed bubble 110. Each incrementally stretched partial width 118a, 118b extends adjacent from the centerline of the collapsed bubble 110 towards one of the two edges 112, 114 of the collapsed bubble 110.

As further shown in FIG. 5, after being incrementally stretched, the collapsed bubble 110 can be separated by splitting operation 140 into a first half-bubble 110a and a second half bubble 110b. The first half-bubble 110a has a first edge 112a and a second edge 112b. The second half-bubble 110b also has a first edge 114a and a second edge 114b. The splitting operation 140 results in the first incrementally stretched partial width 118a on the first half-bubble 110a and the second incrementally stretched partial width 118b on the second half-bubble 110b. Each incrementally stretched partial width 118a, 118b is bounded by un-stretched material on both the first edge 112a, 114a and the second edge 112b, 114b. Each half-bubble 110a, 110b can be rolled onto a separate master roll 134a, 134b.

In one particular example, each incrementally stretched partial width 118a, 118b can be incrementally stretched approximately 14 inches wide after stretching, and have approximately a 12 inch width prior to stretching. The width of each half-bubble 110a, 110b, can be approximately 29 inches prior to stretching and 31 inches after stretching. The un-stretched material that bounds each side of each incrementally stretched partial width 118a, 118b can vary considerably, but in one particular example, the width of each un-stretched area can be approximately 8.5 inches.

Figure 6:
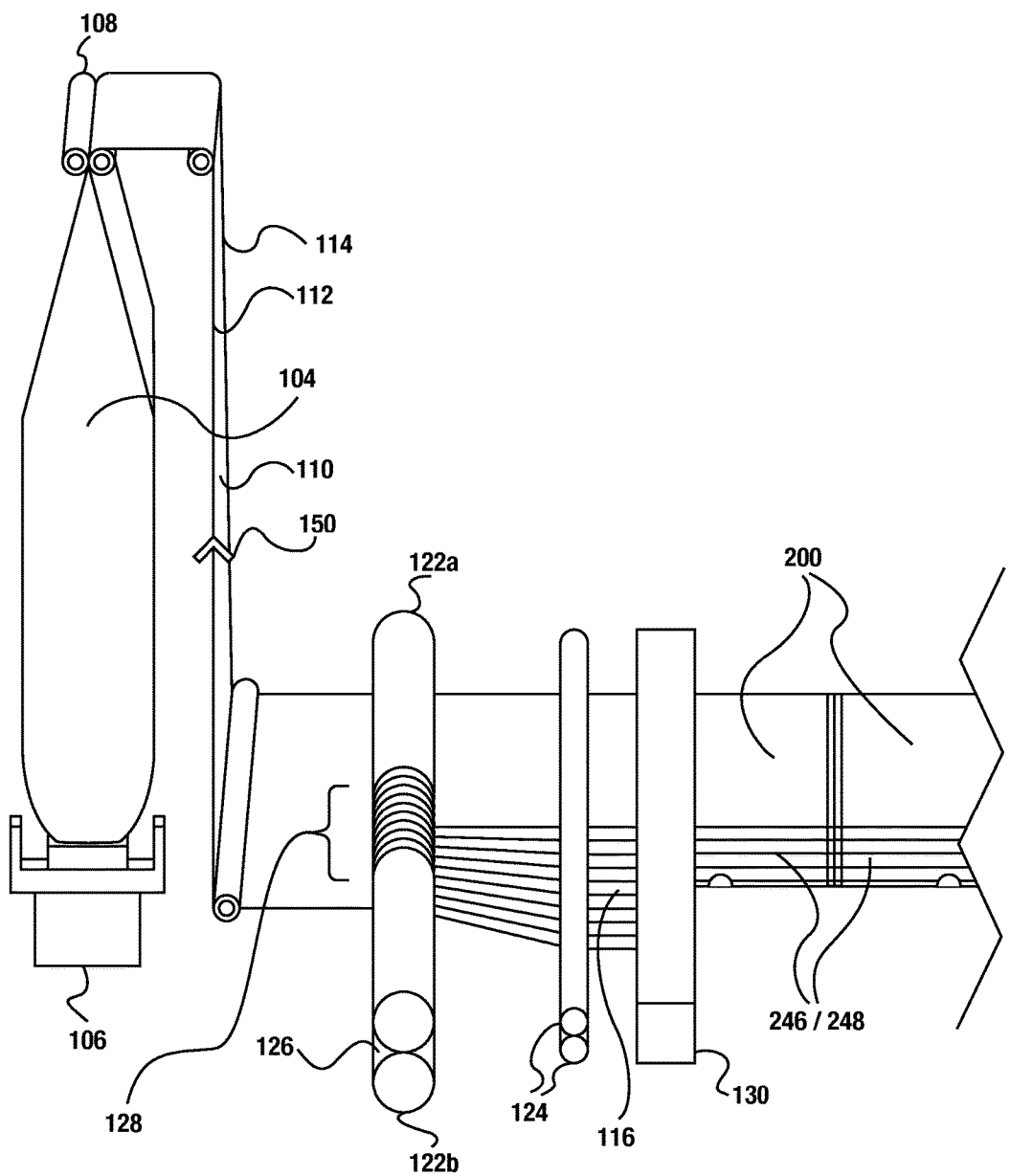
FIG. 6 is a perspective view of a third embodiment of the present invention.

As shown in FIG. 6, in another embodiment of the present invention, a collapsed bubble 110 is incrementally stretched a partial width synchronously with the extrusion of the bubble 104 and the converting of the collapsed bubble 110 into polymeric bags 200. Polymeric resin is first extruded from extruder 106 to form a polymeric tube or bubble 104. After being collapsed by nip rollers 108, the collapsed bubble 110 can be slit on a first edge 112 of the collapsed bubble 110 by a slitting operation 150. In an alternative embodiment, the slitting operation 150 can be performed further downstream after the collapsed bubble 110 has been incrementally stretched. The slitting mechanism cuts a first edge 112 of the collapsed bubble 110 so that the collapsed bubble is open at the first edge 112. The slitting operation 150 results in a first panel and a second panel from the two opposing faces of the collapsed bubble 110 with each panel having a distal end at the first edge 112 and an interconnected end at the second edge 114 of the collapsed bubble 110.

After being slit along the first edge 112, the collapsed bubble 110 can enter a pair of intermeshing rollers 122a, 122b through the nip 126. The intermeshing rollers 122a, 122b can have intermeshing grooves 128a, 128b along only a partial width of the rollers, so that the collapsed bubble 110 is incrementally stretched only along a portion of its width to form an incrementally stretched partial width 116. The intermeshing rollers 122a, 122b can engage the collapsed bubble 110 from the first edge 112 to a certain distance inward from the first edge 112. Once the collapsed bubble 110 is incrementally stretched, it can enter a bag converting operation 130 that converts the incrementally stretched collapsed bubble 110 into a plurality of trash bags 200. The bag converting operation 130 can separate each panel of the collapsed bubble 110 and fold in half the incrementally stretch partial width 116 of each panel towards the second edge 114 to form a pair incrementally stretched extended hems 246, 248 on each trash bag 200.

In one particular embodiment, the entire width of the collapsed bubble 110 of FIG. 6 may be approximately 30 inches and the incrementally stretched partial width 116 may be approximately eight inches before the ring rolling operation completes. After stretching, the incrementally stretched partial width 116 may grow to approximately 10 inches so that the overall width of the collapsed bubble 110 increases to approximately 32 inches. After folding one-half of the incrementally stretched partial width 116 to form the pair of extended hems 246, 248, trash bags 200 may be formed with each trash bag having a final length of approximately 27 inches and each extended hem 246, 248 having a length of approximately 5 inches.

Figure 7:
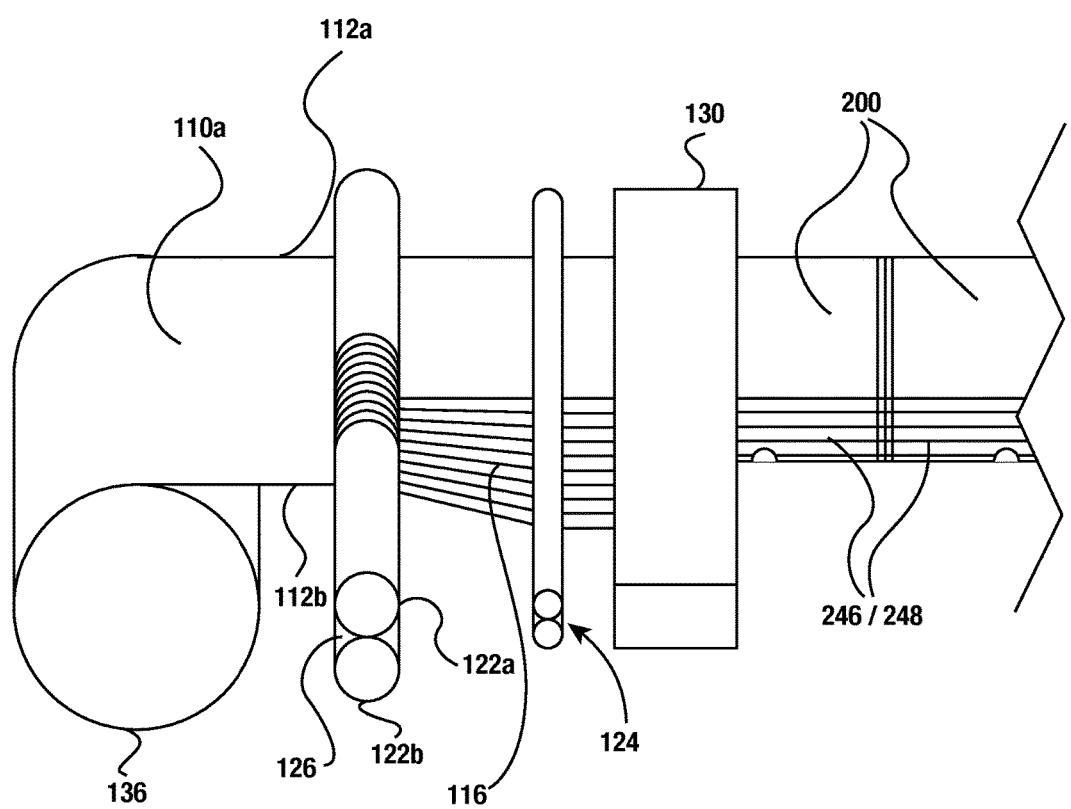
FIG. 7 is a perspective view of a fourth embodiment of the present invention.

In a further embodiment as shown in FIG. 7, a method of forming polymeric bags can begin with a previously slit collapsed half-bubble 110a rolled onto a master roll 136. The collapsed half-bubble 110a on the master roll 136 can have previously been formed in a blown film extrusion process. In this embodiment, the collapsed half-bubble 110a is not incrementally stretched prior to being rolled onto the master roll 136. The collapsed half-bubble 110a is unrolled from the master roll 136 and enters the nip 126 of the pair of intermeshing rollers 122a, 122b. The intermeshing rollers 122a, 122b incrementally stretch the collapsed half-bubble 110a. The collapsed half-bubble 110a is incrementally stretched only a partial width of the collapsed half-bubble 110a. In this embodiment, the incrementally stretched partial width 116 extends from the second edge 112b of the collapsed half-bubble 110a towards the center of the collapsed half-bubble 110a with a length less than half of the width of the collapsed half-bubble 110a. Once the collapsed half-bubble 110a passes through the stretching rollers 124, it enters the bag converting operation 130.

During the bag converting operation 130 shown in FIG. 7, the slit on the second edge 112b of the collapsed half-bubble 110a provides a first panel and second panel from the collapsed half-bubble 110a, each panel having a distal edge at the second edge 112b. Each distal edge of each panel is folded inwards towards itself. The length of each fold is approximately half of each incrementally stretched partial width 116. After being folded, an extended hem 246, 248 is defined in the collapsed half-bubble 110a with the extended hem 246, 248 comprised of the incrementally stretched partial width 116. Prior to or during the folding operation, a drawstring can be inserted adjacent to the fold within the folded area. To complete the bag converting operation 130, side seals and perforations are formed at pre-defined lengths extending along the width of the collapsed half-bubble 110a.

In one particular example of the FIG. 7 embodiment, the entire width of the collapsed half-bubble 110a may be approximately 30 inches and the incrementally stretched partial width 116 may be approximately eight inches before being stretched. After stretching, the incrementally stretched partial width 116 may grow to approximately 10 inches so that the overall width of the collapsed bubble 110a increases to approximately 32 inches. When converted to trash bags 200, these dimensions results in trash bags 200 with a length of approximately 27 inches and having approximately 5 inch long extended hems 246, 248.

Figure 8:
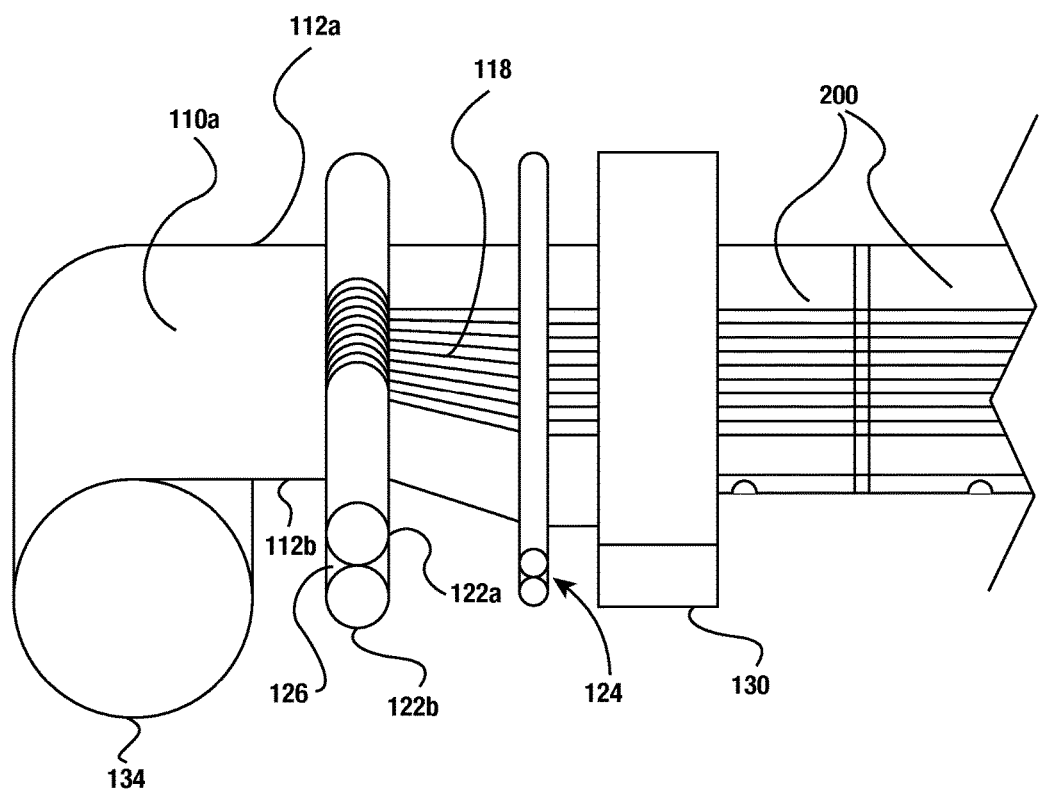
FIG. 8 is a perspective view of a fifth embodiment of the present invention.

In another embodiment shown in FIG. 8, a method of forming polymeric bags can begin with a previously slit collapsed half-bubble 110a rolled onto a master roll 136 as previously described regarding FIG. 7. Rather than incrementally stretching the collapsed bubble 110a proximate to the second edge 112b, a partial width 118 of the half-bubble 110a can be incrementally stretched about the centerline of the half-bubble 110a. As shown in FIG. 8, the incrementally stretched partial width 118 is bounded on both sides by a partial width of un-stretched material of the half-bubble 110a.

In one particular example, the incrementally stretched partial width 118 can be approximately 17 inches prior to stretching and approximately 21 inches after stretching. The un-stretched width adjacent to the second edge 112*b* can be approximately 6 inches and the un-stretched width adjacent to the first edge 112*a* can be approximately 2 inches. The entire width of collapsed half-bubble 110*a* can be approximately 26 inches prior to stretching and approximately 29 inches after stretching.

After being incrementally stretched, the collapsed half-bubble 110*a* can then enter a bag converting operation 130. In the bag converting operation 130, the collapsed bubble can be converted into a plurality of drawstring trash bags 200 as previously discussed. However, for the embodiment shown in FIG. 8, the hem of each drawstring trash bag is not formed from incrementally stretched material but rather un-stretched material. Furthermore, the hem can be formed from less width of the collapsed bubble than the embodiment of FIG. 7. For instance, in one particular embodiment, four inches of the collapsed bubble along the second edge 112*b* can be used to form a resulting hem with a two-inch length after being folded.

Figure 9:
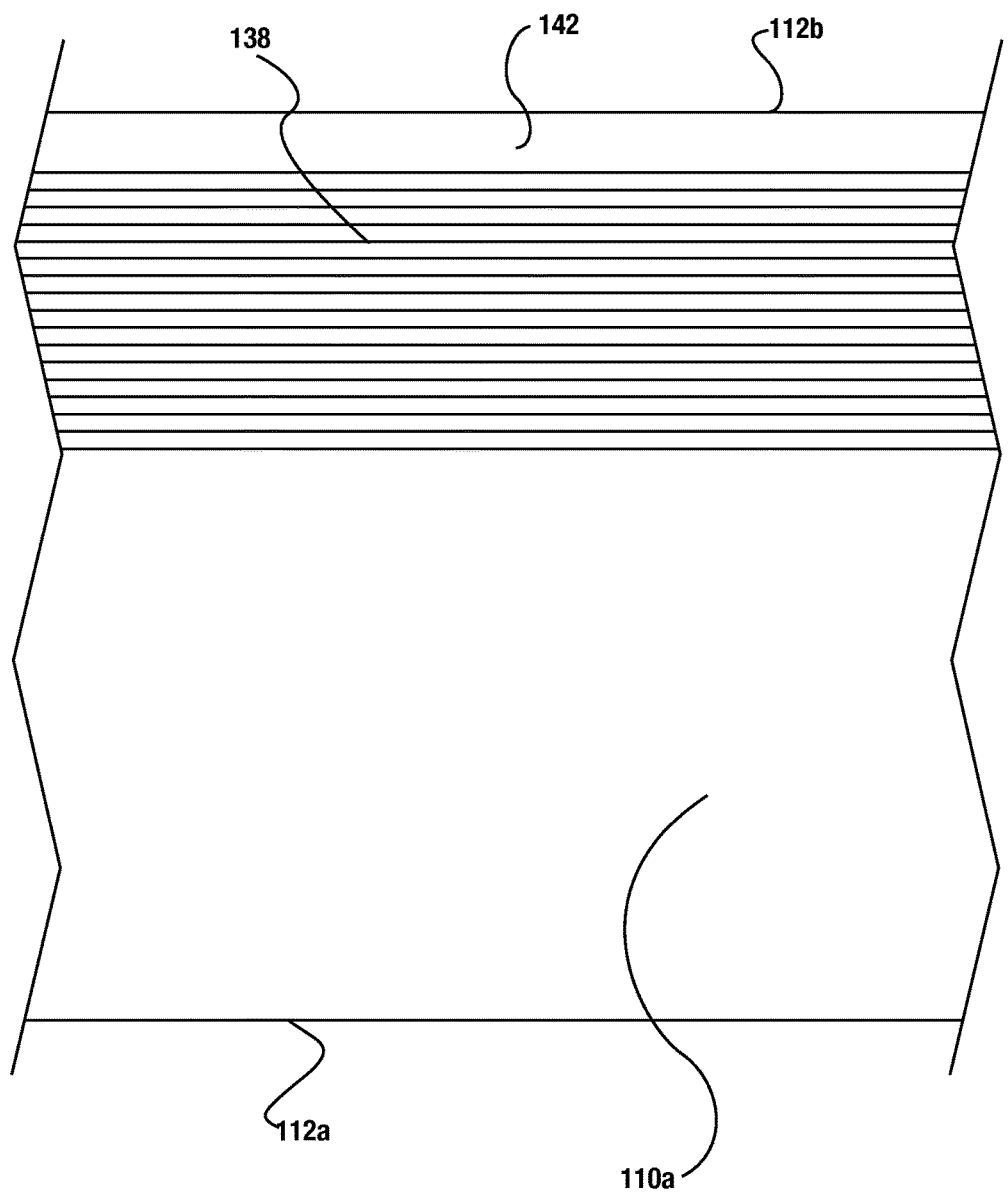
FIG. 9 is a partial top view of a ring rolled collapsed bubble of the present invention.

Shown in FIG. 9 is an alternative embodiment of a partially incrementally stretched collapsed half-bubble 110*a*. The half-bubble 110*a* can be formed in the same manner as described for the embodiments shown in either FIG. 5 or FIG. 8 but with the location of where the plurality of grooves 128*a*, 128*b* of the intermeshing rollers 122*a*, 122*b* engage the collapsed bubble offset from the previous embodiments. As shown in FIG. 9, the incrementally stretched partial width 138 is located adjacent to the second edge 112*b* of the half-bubble 110*a* with a partial width of un-stretched film 142 separating the incrementally stretched partial width 138 from the second edge 112*b*. The width of the incrementally stretched partial width 138 can be limited so that more than half of a width un-stretched material of the half-bubble 110*a* separates the incrementally stretched partial width 138 from the first edge 112*a*. The partial width of un-stretched film 142 can have a width that is a fraction, less than one-half, of the width of the incrementally stretched partial width 138.

In a particular embodiment of the FIG. 9 embodiment, after stretching, the entire width of the collapsed bubble 110 or half-bubble 110*a* can be approximately 32 inches. The incrementally stretched partial width 138 can be approximately nine inches after stretching, the un-stretched region between the incrementally stretched partial width 138 and first edge 112 can be approximately one inch, and the remaining un-stretched width of the collapsed bubble can be approximately 22 inches.

Figure 10:
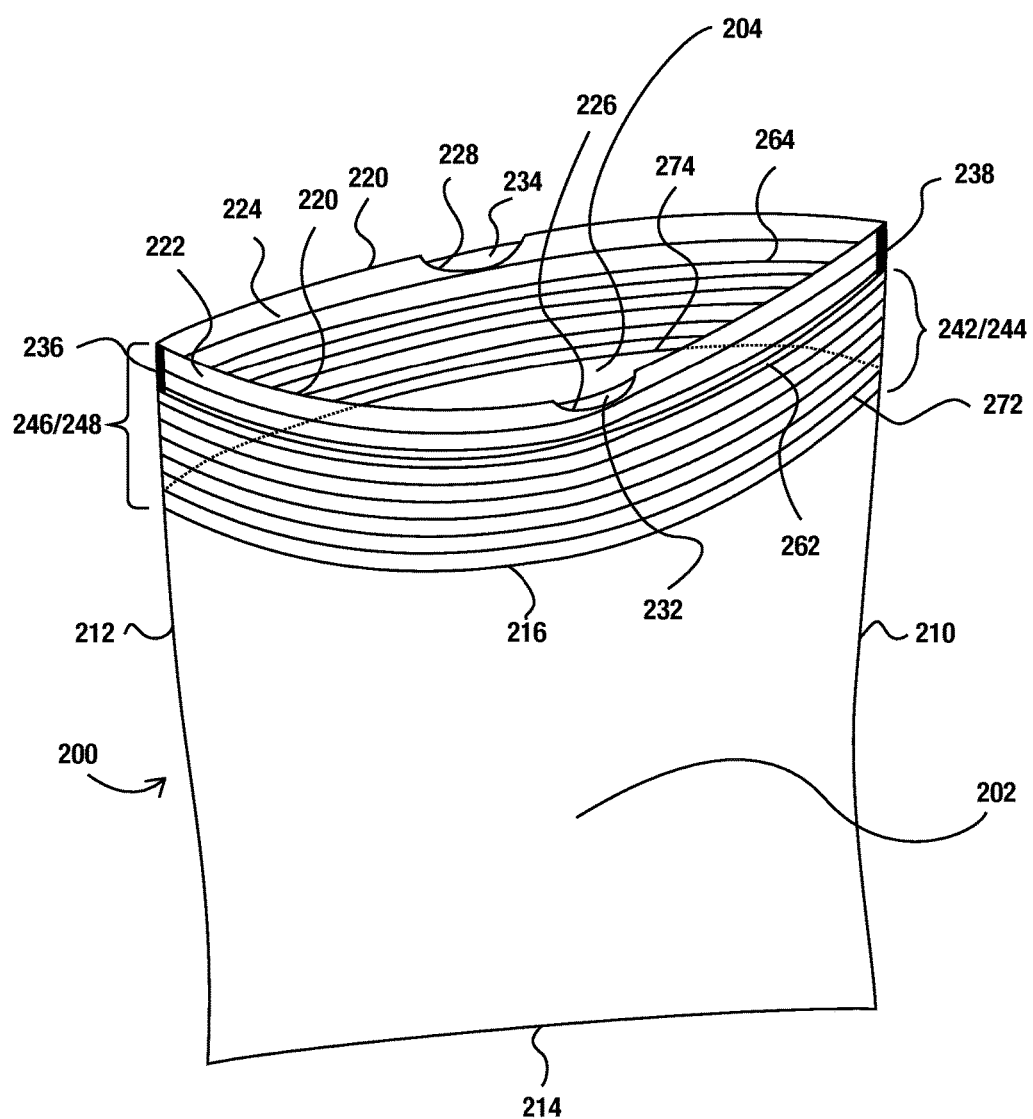
FIG. 10 is a perspective view of a sixth embodiment of the present invention.
Figure 11:
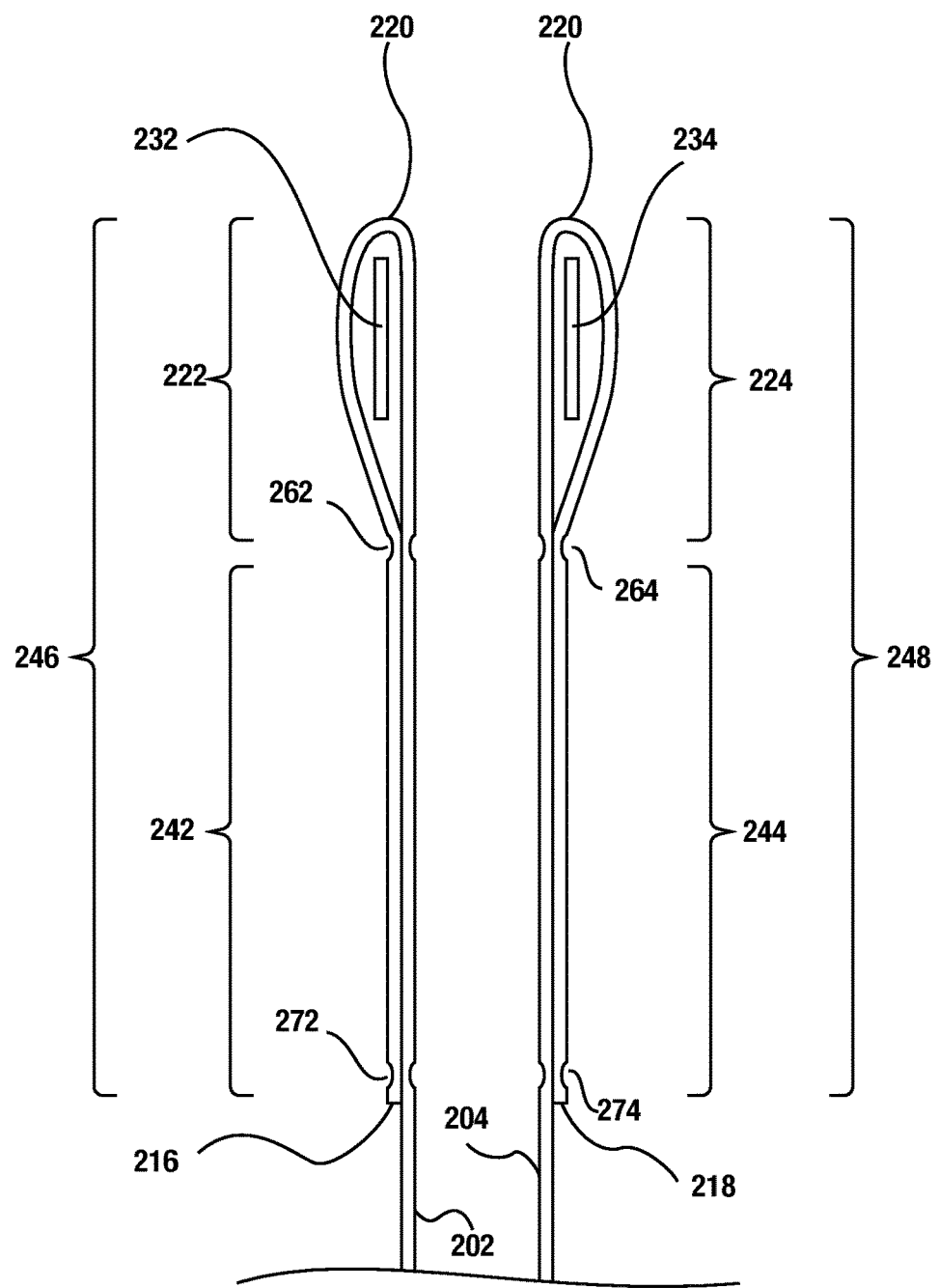
FIG. 11 is a partial cross-sectional view of the sixth embodiment as shown in FIG. 10.
Figure 12:
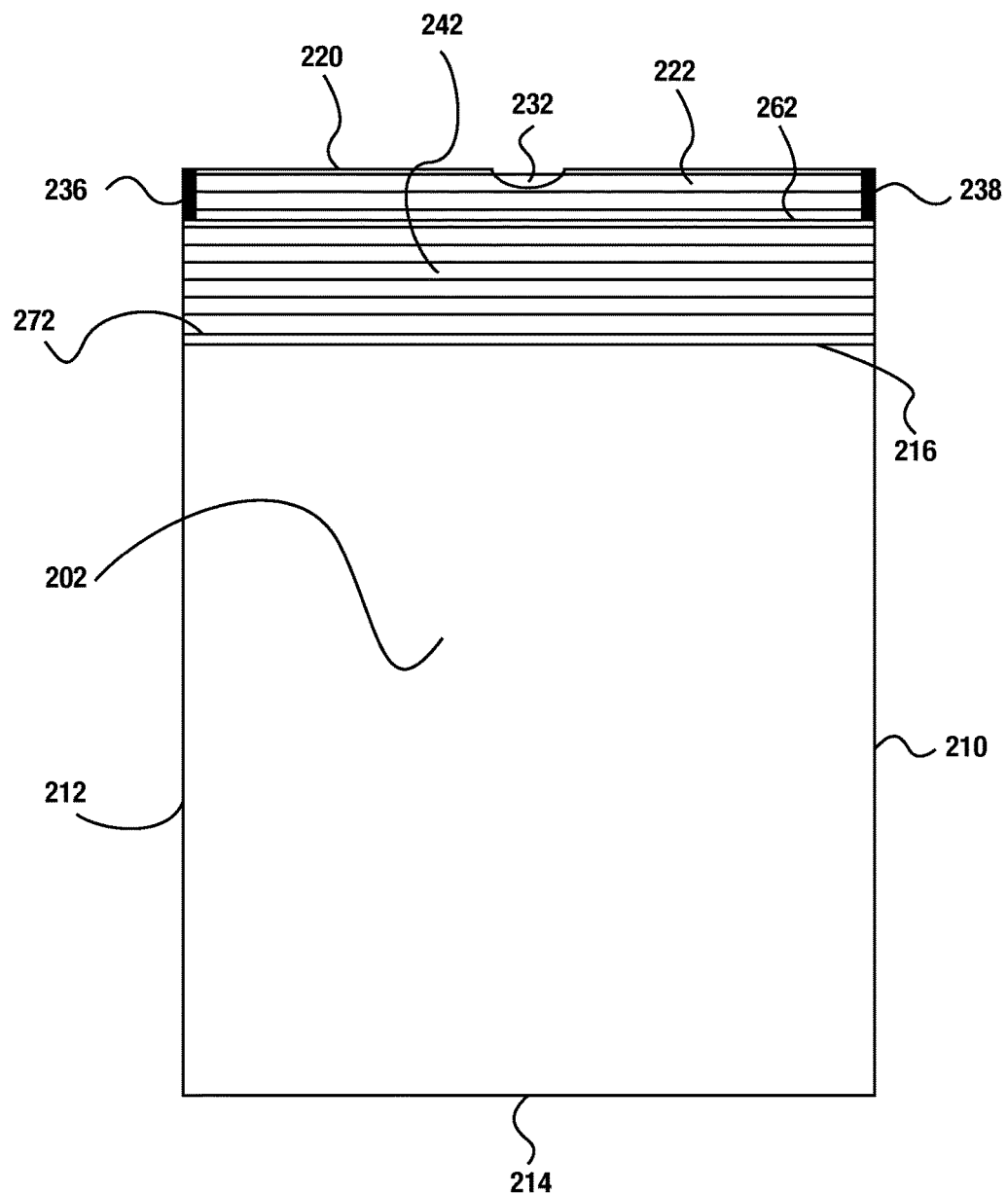
FIG. 12 is front view of the embodiment shown in FIG. 10 and FIG. 11.

As previously discussed, the previously disclosed embodiments of the invention are particularly well adapted for use in an extended hem drawstring trash bag. FIG. 10 provides a perspective view, FIG. 11 provides a top cross-section view, and FIG. 12 provides a front view of such a trash bag. Looking collectively at FIGS. 10-12, the extended hem drawstring trash bag 200 is comprised of a front panel 202 and a back panel 204, the front panel 202 and back panel 204 being substantially rectangular in shape and joined along a first edge 210, a second edge 212, and a bottom edge 214 to provide the body of the bag. The front panel 202 and back panel 204 may be formed from a single piece of polymeric film, such as a section of the collapsed bubble 110 or collapsed half-bubble 110*a*, 110*b*. The bottom edge 114 of the collapsed bubble 110 can form the bottom edge 214 of the trash bag 200. The section of the collapsed bubble 110 is subsequently sealed along the first edge 210 and second edge 212 of the trash bag.

In FIG. 11, a cross-sectional partial view of the extended hem drawstring trash bag 200 is shown. In particular, an upper cross-section of a drawstring trash bag 200 is depicted, although the thicknesses and dimensions are exaggerated to better illustrate the relation between the various parts of the bag. During manufacture of the bag, the distal edge 216 of the front panel 202, i.e. the edge of the folded-over portion of the front panel 202 results from the fold-over portion defining the first hem 222 in the front panel 202 and a first drawstring 232 disposed within the first hem 222. Similarly, the distal edge 218 of the back panel 204 results from the fold-over portion defining the second hem 224 with a second drawstring 234 disposed in the second hem 224. The upper boundaries of the hems 222, 224 define the upper opening 220 of the drawstring trash bag 200.

The drawstrings 232, 234 may be comprised of traditional high-density polyethylene drawstrings or, in some embodiments, elastic or elastic-like polymeric components. The drawstrings 232, 234 are anchored to the front panel 202 and back panel 204 at the ends of the respective drawstrings 232, 234 near the first side edge 210 and second side edge 212. In particular, the drawstrings 232, 234 are commonly anchored using short seals 236, 238 as shown in FIGS. 10 and 12, the short seals 236, 238 fusing both drawstrings 232, 234 with both the front panel 202 and the back panel 204. Other than the anchor point, the drawstrings 232, 234 are generally loose within the hems 222, 224 enabling the drawstrings 222, 224 to be accessed and pulled through the respective drawstring cutouts 226, 228 centrally located between the first side edge 210 and second side edge 212. Consequently, when the drawstrings 232, 234 are pulled through the drawstring cutouts 226, 228 of the drawstring trash bag 200, the respective upper corners of the drawstring trash bag 200 are pulled together to facilitate closure of the bag.

Now looking at FIGS. 10-12, the distal edges 216, 218 of the respective front and back panels 202, 204 are located a distance below the respective hems 222, 224. Thus, the front panel 202 has an overlap area 242 that extends from the lower boundary of the first hem 222 to the distal edge 216 of the front panel 202. In the same manner, the back panel 204 has an overlap area 244 that extends from the lower boundary of the second hem 224 to the distal edge 218 of the back panel 204.

Thus, for the front panel 202, the overlap area 242 comprises two layers of polymeric film, and the hem overlap area 244 of the back panel 204 also comprises two layers of polymeric film according to the depicted embodiment. The length of the first overlap area 242 and the second overlap area 244 can be selected to be any length including a distance ending only slightly below the bottom boundaries of the respective hems 222, 224 or a distance that extends nearly to the bottom of the bag. The area of the first hem 222 and overlap area 242 defines a first extended hem area 246. In a likewise manner, the area of the second hem 224 and the overlap area 244 defines a second extended hem area 248.

When utilizing the above-described methods of incremental stretching, the extended hem areas 246, 248 may be comprised of the partially incrementally stretched width 116, 116*a*, 116*b*, or 138 of FIG. 2, 6, 7, or 9, depending upon the method utilized to form the incrementally stretched width.

The drawstring trash bag depicted in FIGS. 10-12 is illustrated as having hem seals 262, 264 extending across the width of the drawstring trash bag 200. Additionally, lower seals 272, 274 are provided in the respective panels 202, 204 proximate to the respective distal edges 216, 218. By providing hem seals 262, 264 near the top of the overlap areas 242, 244 and lower seals 272, 274 near the bottom of the overlap areas 242, 244, the two layers of polymeric film comprising each overlap area 242, 244 are kept in close proximity, providing effectively a two-ply polymeric film of increased thickness in the region of the overlap areas 242, 244.

The overlap areas 242, 244, as shown in the depicted embodiments, provide important benefits during use of the drawstring trash bag 200. The primary benefit offered by the overlap areas 242, 244 is reinforcing the drawstring trash bag 200 in the areas immediately below the hems 222, 224 and drawtape 232, 234. As best illustrated by FIG. 11, it can be seen that the thickness of the polymeric film is increased substantially in the overlap areas 242, 244 compared to the remaining area of the front panel 202 and back panel 204 below the overlap areas 242, 244. The thicker overlap area 242, 244 is therefore expected to be stronger than the remainder of the bag. Thus, in the event that a consumer is carrying the bag or gripping the bag in one or both of the overlap areas 242, 244, it is less likely that the drawstring trash bag 200 will puncture or tear in that particular area. By reducing the likelihood that the drawstring trash bag 200 will fail when a consumer grabs the drawstring trash bag 200 in the overlap areas 242, 244, the drawstring trash bag 200 is more useful—especially when it contains heavier items or debris.

For example, in the case of a collapsed bubble 110 or collapsed half-bubble 110a, the film of the bubble can have a nominal thickness of 0.7 mil. The incrementally stretched partial width 116 or 116a of FIG. 2, 6, 7 can have a width of 10 inches with an average stretch of 20 percent, which leads to approximately an average thickness of 0.56 mil for the incrementally stretched partial width 116 or 116a. The incrementally stretched collapsed bubble 110 or collapsed half-bubble 110a can be formed into extended hem trash bags 200 with the incrementally stretch partial width 116, 116a formed into the extended hem areas 246, 248. The resulting average thickness of each extended hem areas 246, 248 can be approximately 1.12 mil, with each extended hem area 246, 248 having a length of approximately 5 inches. Thus, the extended hem areas 246, 248 may provide an increase in overall film thickness and hence strength while not utilizing as much material as would be required from film that had not been partially incrementally stretched.

If the extended hem areas 246 and 248 were composed of un-stretched film, then the thickness of the extended hem areas would be double in relation to the remaining body of the bag. Although this would be expected to provide for a substantial increase in the strength of the extended hem area of the bag, it also would substantially increase the amount of polymeric resin used to manufacture the bag. By forming the extended hem areas 246, 248 of the bag from film that has been incrementally stretched, a substantial increase in strength is imparted to this area of the bag while decreasing the amount of material required to manufacture each bag in comparison to an extended hem bag not utilizing film that has been partially incrementally stretched.

Figure 13:
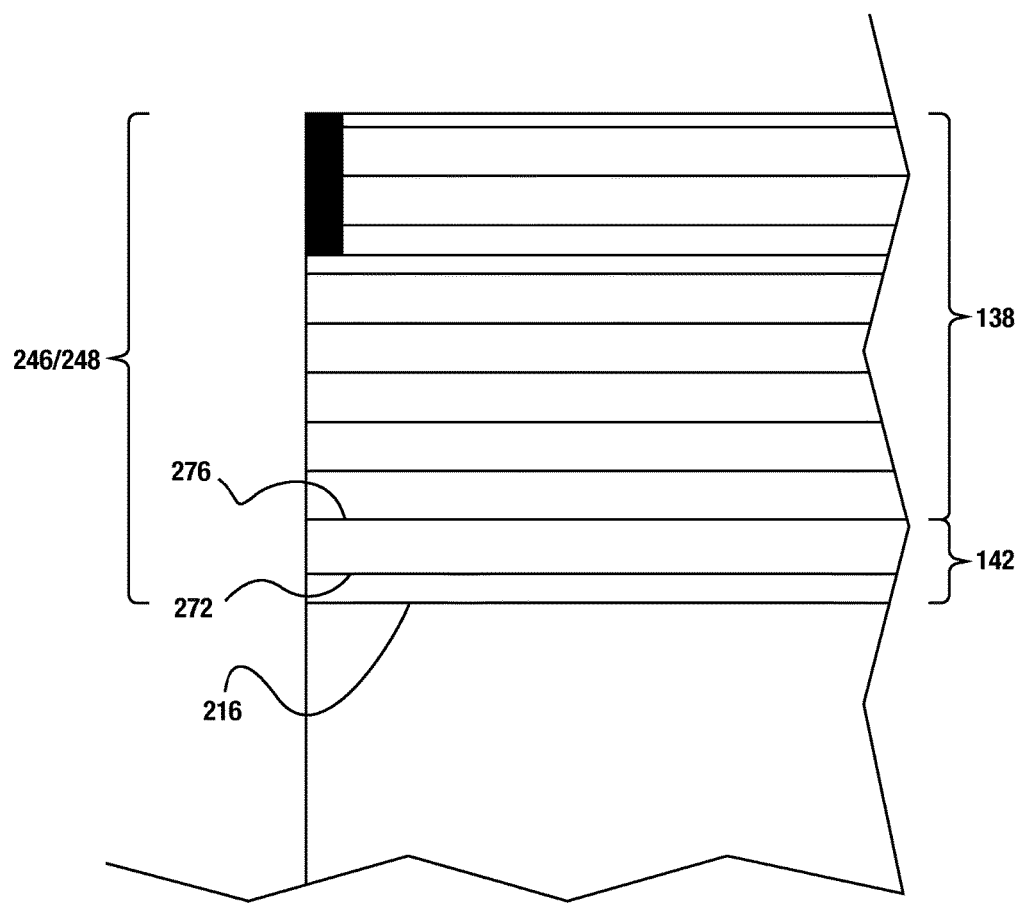
FIG. 13 is a partial detailed front view of a seventh embodiment of the present invention.

The collapsed half-bubble 110a of FIG. 9 can also be used to form an extended hem drawstring trash bag as shown in FIGS. 10-12. A detailed sectional view of this bag is shown in FIG. 13. To form the extended hem areas 246 and 248 of the trash bag, each panel of the collapsed bubble 110 can be folded into itself a slight distance below a middle of the incrementally stretched partial width 138. Thus, the incrementally stretched partial width 138 encompasses a substantial portion of the extended hem areas 246 and 248. However, a bottom area of the extended hem area 246 extending from the distal edge 216 and encompassing the location of the lower seal 272 is comprised of the partial width of un-stretched film 142 of FIG. 9. This partial width of un-stretched film 142 of FIG. 9 is shown in FIG. 13 extending from the distal edge 216 to the border of the incrementally stretched partial width 276. In one particular example, a width of the un-stretched film 142 can be approximately one inch.

Use of the incrementally stretched partial width 138 of FIG. 9 offers additional advantages from other methods disclosed to form an incrementally stretched partial width. For instance, there is a risk that incremental stretching of the film of the collapsed bubble could interfere with the sealing of the trash bag, such as for the lower seal 272 of FIG. 13. Use of the incrementally stretched half-bubble 110a of FIG. 9 limits this risk since the film is not stretched at the location of the lower seal 272. Thus, a more secure lower seal 272 may result from this embodiment and lead to a stronger and more reliable trash bag.

Figure 14:
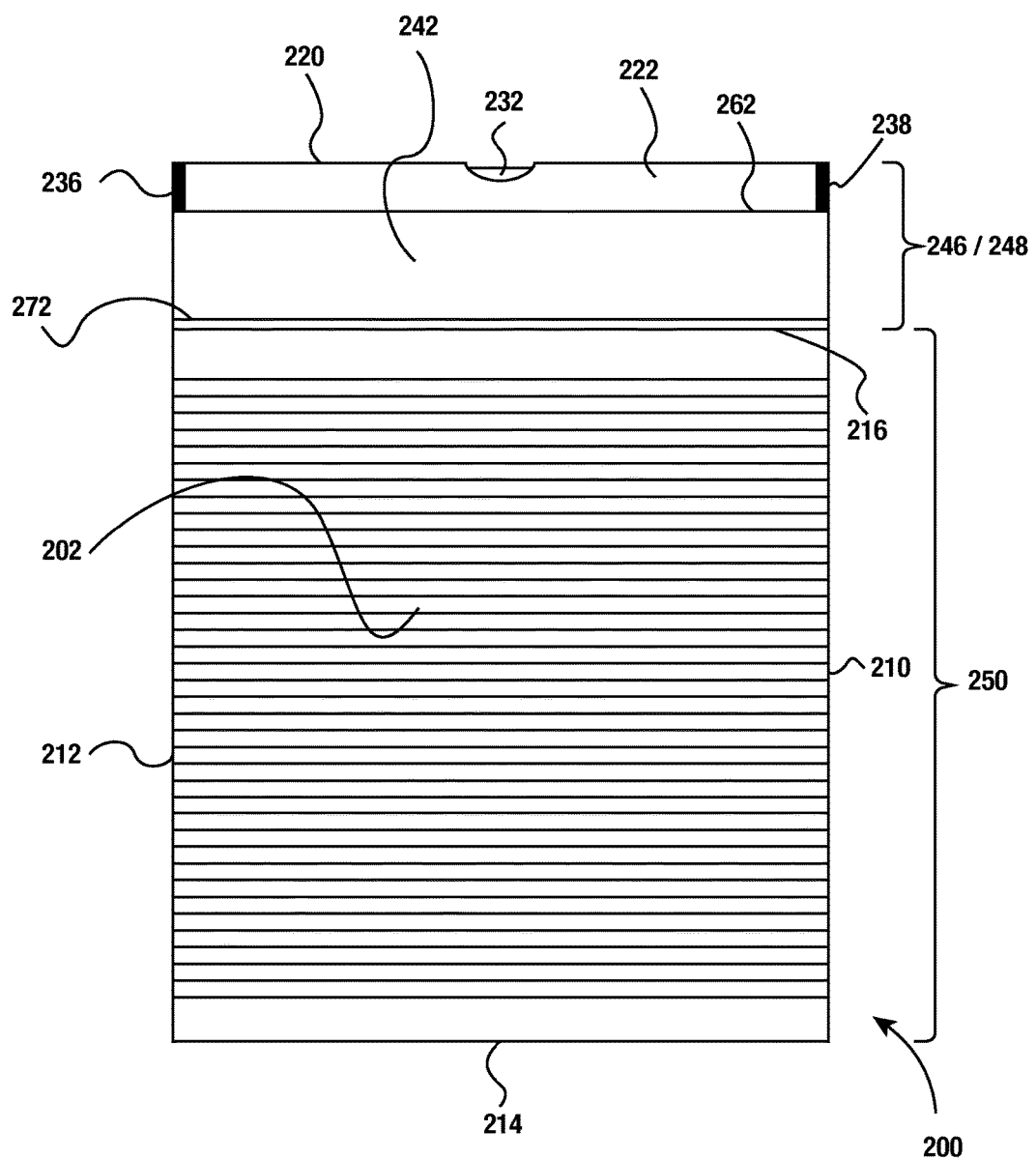
FIG. 14 is a front view of an eighth embodiment of the present invention.

FIG. 14 illustrates another extended hem drawstring trash bag utilizing an incrementally stretched partial width created via the methods previously described. The trash bag 200 shares many of the same features as the trash bag illustrated in FIGS. 10-12. Hence, likewise features share the same identifiers as the previous figures. However, the bag illustrated by FIG. 14 utilizes incremental stretching in a different area of the bag from the previously illustrated bag of FIGS. 10-12. Rather than utilizing incremental stretching on the extended hem drawstring trash bag in the extended hem areas 246, 248 of the trash bag, the bag body 250 is incrementally stretched. The processes discussed and shown for FIGS. 5 and 8 may be utilized to manufacture the bag shown in FIG. 14. This embodiment allows use of film with a thinner average gauge to be present in the bag body 250 for circumstances where it is desirable for the extended hem areas 246, 248 to have greater than twice the thickness of the bag body. The bag body 250 can be defined to be the section of the front and back panel 202, 204 located below the lower seals 272, 274 and above the bottom edge 214.

In one particularly example for FIG. 14, the processes described above can form a collapsed bubble 110 or collapsed half-bubble 110a having a film thickness of approximately 0.8 mil. Thus, the total thickness of each extended hem area 246, 248 will be approximately 1.6 mil. However, if the 0.8 mil film is stretched on average 15 percent, the resultant average thickness of the incrementally stretched region of the bag body will be approximately 0.68 mils. In a particular embodiment, the length of the incrementally stretched region of the bag body 250 can be approximately 18 inches with two inches of the bag body 250 on each side of the incrementally stretched region left un-stretched. Thus, the entire length of the bag body 250 can be 22 inches. The extended hem area of the bag can have a length of 5 inches so that the entire length of the bag 200 is approximately 27 inches.

Figure 15:
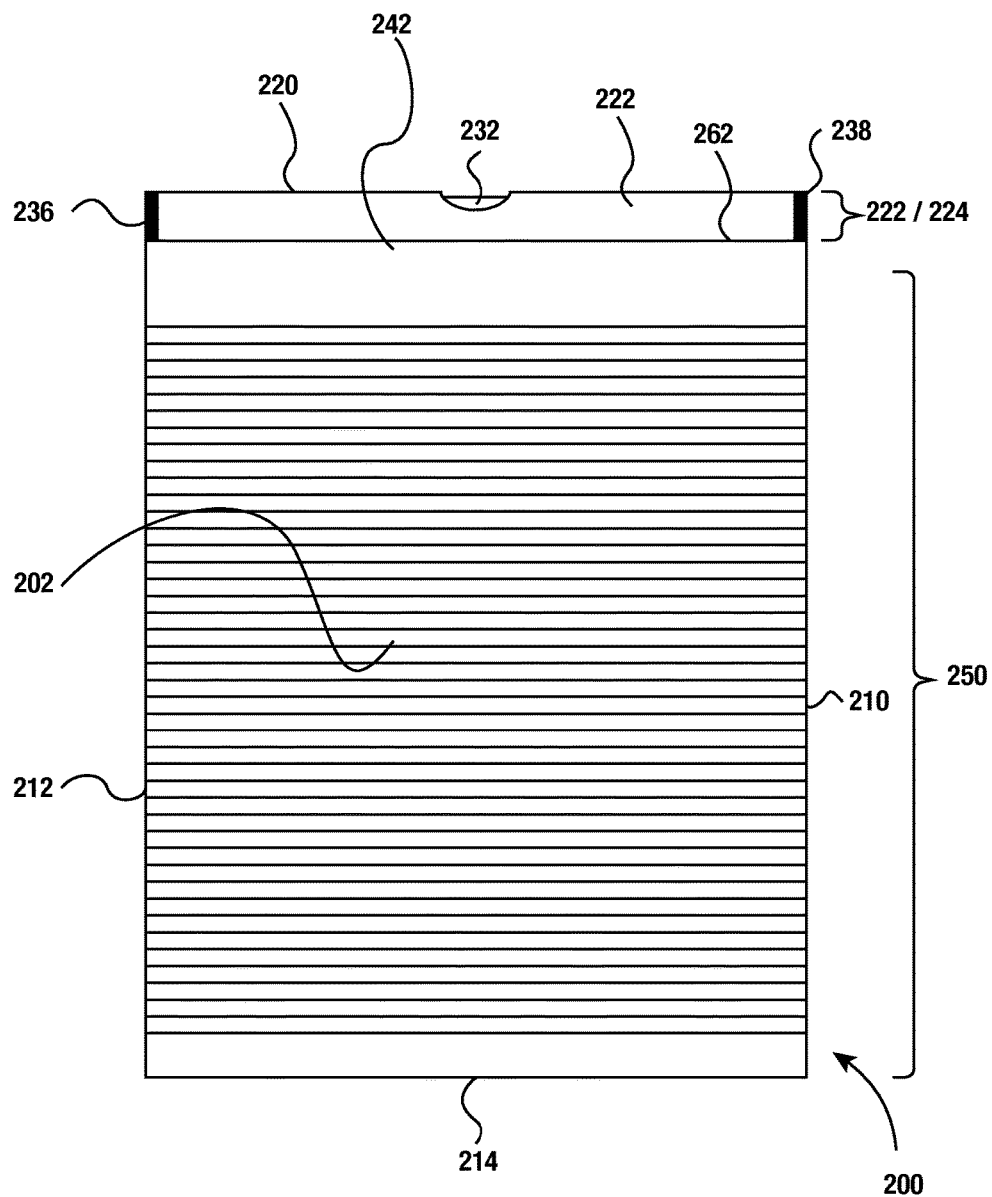
FIG. 15 is a front view of a ninth embodiment of the present invention.

A further embodiment of a drawstring trash bag is shown in FIG. 15 that may utilize the previously discussed methods of partial incremental stretching of a collapsed bubble. The embodiment of FIG. 15 fails to include overlap areas 242, 244 and hence does not include an extended hem area 246/248 as shown in FIG. 11. In this instance, the bag body 250 is incrementally stretched to reduce the amount of film used in the bag body 250. The processes discussed and shown for FIGS. 5 and 8 may be utilized to manufacture the bag shown in FIG. 15.

The amount of film used is limited in this embodiment since the hem is not extended, relative to the embodiment shown in FIG. 14. The embodiment of FIG. 15 allows the use of a thicker film than normally would be used to increase the strength of the bottom of the bag and the hems 222, 224 of the bag. By utilizing one of the incremental stretching methods described above, the bag body 250 can be incrementally stretched while the hems 222, 224 and the film immediately below the hems 222, 224 can be left un-stretched so that the area proximate to the hems 222, 224 has greater strength than the remaining area of the bag.

In one particular embodiment, the collapsed bubble film thickness can be a nominal thickness of one mil. A partial width of the collapsed bubble 110 or collapsed half-bubble 110*a* can be stretched approximately 20 percent so that when the collapsed bubble 110 or collapsed half-bubble 110*a* is converted into bags, the bag body 250 comprises the incrementally stretched film. The resultant average thickness of the bag body 250 that has been incrementally stretched can be approximately 0.8 mil. For a trash bag with an overall length of approximately 27 inches, approximately 21 inches of the bag body can be incrementally stretched with approximately two inches of the bag bottom un-stretched, leaving approximately a two-inch un-stretched hem, and approximately two inches below the hem un-stretched. Thus, the bag 200 should have targeted increased strength in the bag bottom and hem area, in comparison to a bag made exclusively out of un-stretched 0.8 mil film.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

I claim:

1. A bag formed from polymeric film of a collapsed bubble, the bag comprising:
   a front panel and a back panel, the front panel and back panel generally joined along a first side edge, a second side edge, and a bottom edge of the respective front panel and back panel,
   the front panel having an upper distal edge opposite the bottom edge, the distal edge resulting from a folded over portion of the front panel providing a first hem and a first overlap area immediately below the first hem, a top of the first hem defining an upper opening of the bag,
   the first overlap area comprising at least two layers of polymeric film below the first hem, a first lower seal sealing together the at least two layers of polymeric film, and
   the first hem and the first overlap area comprising incrementally stretched polymeric film.

2. The bag of claim 1 further comprising:
   the polymeric film below the first lower seal comprising un-stretched polymeric film.

3. The bag of claim 2 further comprising:
   the polymeric film below the first lower seal devoid of incrementally stretched polymeric film.

4. The bag of claim 1 further comprising:
   a first hem seal sealing the folded over portion to the front panel at a bottom of the first hem, and
   the first hem encapsulating a drawstring.

5. The bag of claim 4 further comprising:
   the first overlap area failing to include a drawstring.

6. The bag of claim 1 further comprising:
   the incrementally stretched polymeric film comprising a fraction of an incrementally stretched partial width of the collapsed bubble.

7. The bag of claim 6 further comprising:
   the incrementally stretched partial width having a width less than half of the collapsed bubble.

8. A bag formed from polymeric film of a collapsed bubble, the bag comprising:
   a front panel and a back panel, the front panel and back panel generally joined along a first side edge, a second side edge, and a bottom edge of the respective front panel and back panel,
   the front panel having a distal edge opposite the bottom edge, the distal edge of the front panel resulting from a folded over portion of the front panel providing a first hem and a first overlap area immediately below the first hem, a top of the first hem defining an upper opening of the bag,
   the first overlap area comprising at least two layers of polymeric film sealed together by a first lower seal below the first hem,
   the first hem and the first overlap area comprising incrementally stretched polymeric film, and
   the front panel below the first overlap area comprising un-stretched polymeric film.

9. The bag of claim 8 further comprising:
   the bottom edge of the bag corresponding to an outer edge of the collapsed bubble.

10. The bag of claim 8 further comprising:
    the polymeric film below the first lower seal comprising un-stretched polymeric film.

11. The bag of claim 8 further comprising:
    the incrementally stretched polymeric film comprising an incrementally stretched partial width of the collapsed bubble.

12. The bag of claim 8 further comprising:
    the first hem of the polymeric bag including a drawstring.

13. The bag of claim 8 further comprising:
    the first overlap area failing to include a drawstring.

14. A bag formed from polymeric film of a collapsed bubble, the bag comprising:
    a front panel and a back panel, the front panel and back panel generally joined along a first side edge, a second side edge, and a bottom edge of the respective front panel and back panel,
    the front panel having a distal edge opposite the bottom edge, the distal edge of the front panel resulting from a folded over portion of the front panel providing a first hem and a first overlap area immediately below the first hem, a top of the first hem defining an upper opening of the bag,
    the first overlap area comprising at least two layers of film below the first hem sealed together by a first lower seal,
    a first bag body of the first panel defined between the first lower seal and the first bottom edge,
    the first bag body comprising an incrementally stretched polymeric film, and
    the front panel above the first lower seal comprising un-stretched polymeric film.

15. The bag of claim 14 further comprising:
    a first hem seal sealing the folded over portion to the front panel at a bottom of the first hem, and
    the polymeric film above the hem seal comprising un-stretched polymeric film.

16. The bag of claim 14 further comprising:
    the incrementally stretched polymeric film incrementally stretched synchronously with formation of the collapsed bubble.

17. The bag of claim 14 further comprising:
    the first hem of the bag including a drawstring.

18. The bag of claim 14 further comprising:
the first overlap area failing to include a drawstring.
19. The bag of claim 14 further comprising:
the incrementally stretched polymeric film comprising a fraction of an incrementally stretched partial width of the collapsed bubble.
20. The bag of claim 19 further comprising:
the incrementally stretched partial width having a width less than half of the collapsed bubble.

* * * * *